J. F. & E. B. BLAKEY.
COMPENSATING GEARING.
APPLICATION FILED NOV. 24, 1913.
1,134,665.
Patented Apr. 6, 1915.
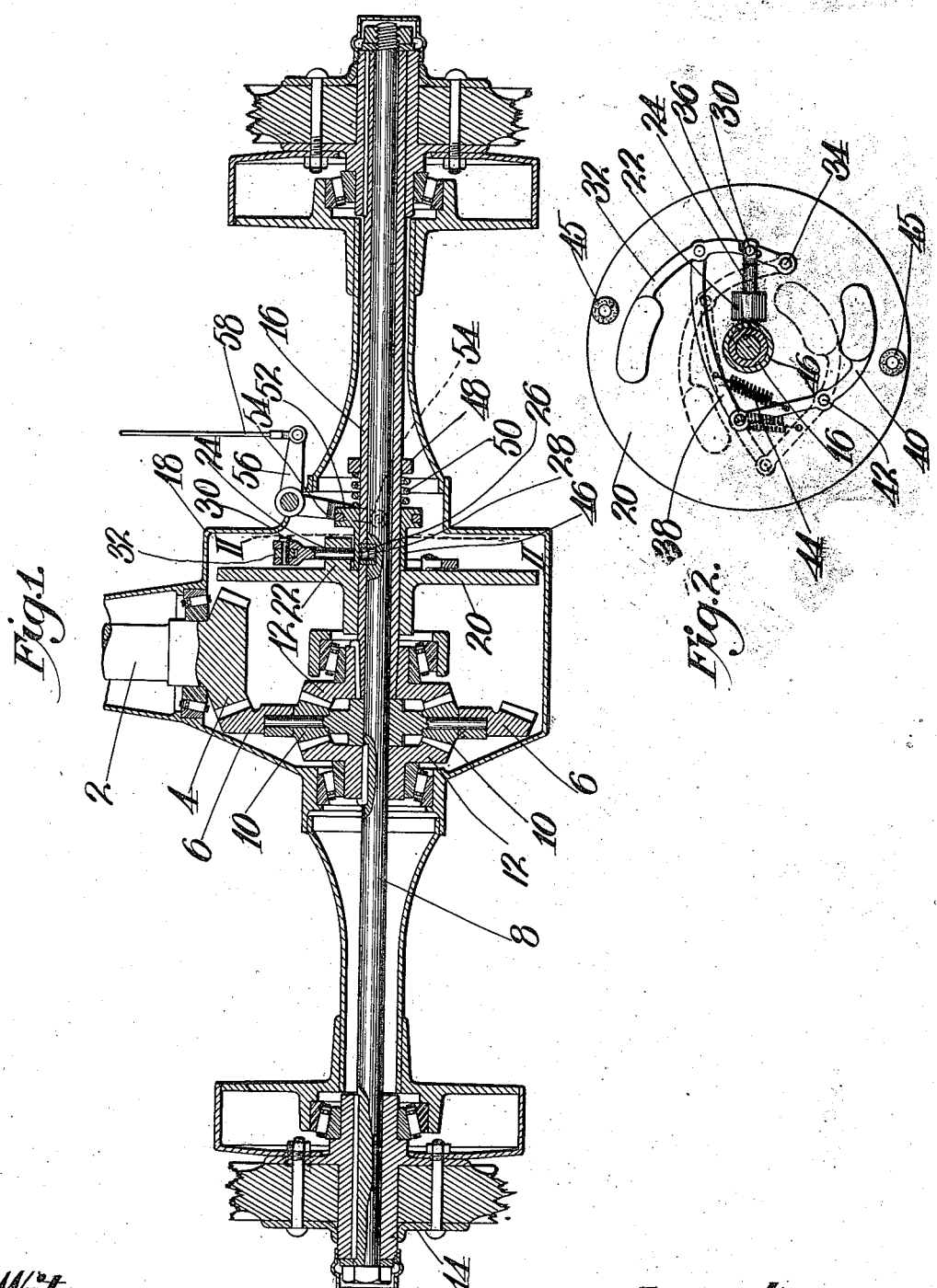
Witnesses
Inventors:
J. F. Blakey and E. B. Blakey
By George F. Thorpe Atty

UNITED STATES PATENT OFFICE.

JOSEPH F. BLAKEY AND EDWARD B. BLAKEY, OF KANSAS CITY, MISSOURI.

COMPENSATING GEARING.

1,134,665.

Specification of Letters Patent.

Patented Apr. 6, 1915.

Application filed November 24, 1913. Serial No. 802,839.

*To all whom it may concern:*

Be it known that we, JOSEPH F. BLAKEY and EDWARD B. BLAKEY, citizens of the United States, residing at Kansas City, in the county of Jackson and State of Missouri, have invented certain new and useful Improvements in Compensating Gearing, of which the following is a specification.

This invention relates to improvements in compensating gears for self propelled vehicles and one object in view is to provide a gear and axle construction so arranged as to operate with compensation under ordinary conditions but which may upon occasions requiring it, be converted into a non-compensating construction, as for example where it is desired to derive traction equally from both wheels.

It is also an object to provide means whereby the compensating action may be automatically restored after a given axle speed has been attained.

The invention further contemplates an improved arrangement of the axles and gearing whereby a more substantial and reliable construction is obtained and the gearing and housing therefor subjected to less severe strains.

With these objects in view the invention consists in certain novel and peculiar features of construction and organization as hereinafter described and claimed; and in order that it may be fully understood reference is to be had to the accompanying drawings, in which—

Figure 1, is a longitudinal section through the rear axle of a motor car and its differential gear with my improvements embodied therein. Fig. 2, is a transverse section of the line II—II of Fig. 1.

Referring to the drawing, the same illustrates the usual driving shaft 2 having the gear 4 which meshes with the master gear 6 mounted on shaft 8 and carrying the differential pinions 10. These pinions mesh with the axle gears 12, one of which is keyed to the shaft 8 carrying one of the wheels 14 and the other gear 12 is keyed to the sleeve 16 on which is mounted the other wheel 14. The sleeve 16 is journaled upon the axle shaft 8 which extends from one wheel 14 to the other thereby affording a much more substantial and secure construction than where independent axles are employed at each side of the compensating gear, since the latter and its housing 18 are relieved of much strain by confining the same mainly to the continuous axle 8.

It is well known that with the ordinary type of compensating gear above indicated, the vehicle can not be propelled from the engine if one of the propelling wheels has completely lost its traction (as by meeting with a slippery tract in the roadbed) since all of the power is merely transmitted to the tractionless wheel, causing the latter to spin. We aim to avoid this difficulty by rendering the gear non-compensating through the locking of the two axles together until the traction is restored to both wheels. In carrying out this purpose, we provide a disk 20 which is secured to the sleeve 16 within the housing 18, and on one face of the disk is formed a guide lug 22 for the locking pin 24 which is adapted to be projected through an opening 26 in the sleeve 16 into a socket 28 in the shaft 8. The outer end of the pin 24 is pivoted by a pin 30 to a lever 32 which is pivoted to the disk 20 at 34. The pin 30 rides in the short slot 36 in the lever 32. The lever 32 is connected by a link 38 with a second lever 40 which is pivoted to the face of the disk at 42, the adjacent ends of said link 38 and lever 40 being also connected by a coil spring 44 whereby the connected parts are swung in position normally to force the pin 24 inward to engage the opening 26 and socket 28 when not otherwise prevented. The free ends of the levers 32 and 40 are enlarged to weight the same so that under the operation of centrifugal force, after the disk 20 has reached a given rotative speed, the levers will be spread against the action of spring 44, thereby automatically disengaging the pin 24 and unlocking the axles as shown in Fig. 2. Springs or buffers 45 are located near the periphery of the disk in position to be engaged by said levers and thereby limit their movement. A guard sleeve 46 is mounted slidingly upon the sleeve 16, between which guard sleeve and collar 48, also fixed to the sleeve 16, is mounted a coil spring 50 serving normally to hold the guard sleeve in position over the opening 26 to prevent the locking pin 24 from entering the same under the pull of spring 44. The guard sleeve is provided with a grooved flange 52 within the groove of which projects the fingers of a yoke 54 formed on the end of a bell crank lever 56, pivotally carried by the housing 18. This bell crank is operated by any suitable connections, of which the link 58 shown in Fig. 1 forms a part, from the driver's seat to withdraw the guard sleeve against the action of spring 50 and thereby uncover opening 26 and permit the locking pin 24 to be actuated by the spring 44 to enter said opening and the socket 28, thus locking the axles.

As above indicated the only action called for by the driver is to operate the bell crank which immediately permits the locking pin to lock the axles as soon as the opening 24 and socket 28 are in register. The shaft 8 and sleeve 16 then operate as one axle, and power is transmitted equally to both wheels, and if either wheel possesses tractive action, the vehicle may be driven therefrom. After the vehicle has been started and as soon as the axle speed is sufficient to fully spread the levers 32 and 40, the locking pin is again retracted thereby restoring the compensating character of the gear.

From the above description it will be apparent that we have provided an improved compensating gear for motor vehicles embodying the features of advantage enumerated as desirable, and we wish it to be understood that while we have illustrated and described one form which the invention is designed to take, we do not desire to be restricted to the exact details of construction and organization shown but reserve the right to make all changes falling within the spirit and scope of the appended claims:

We claim:

1. The combination with compensating gearing, of a pair of rotating members driven from said gearing, means for locking said members together for operation by said gearing without compensation, and means acting automatically to render said first means inoperative after said members have attained a given speed of rotation.

2. The combination with a rotating shaft, of a rotary sleeve journaled on said shaft, said sleeve and shaft being provided with an opening and socket respectively adapted to be brought into register, a compensating gearing operatively connected with said shaft and sleeve to drive the same, a locking pin carried by said sleeve in alinement with said sleeve opening, means for projecting said pin through said opening into said socket to lock said shaft and sleeve together for operation by said gearing without compensation, and means acting automatically to retract said pin and unlock said shaft and sleeve after the same have attained a predetermined speed of rotation.

3. The combination with a rotating shaft, of a rotary sleeve journaled on said shaft, said sleeve and shaft being provided with an opening and socket respectively adapted to be brought into register, a compensating gearing operatively connected with said shaft and sleeve to drive the same, a locking pin carried by said sleeve in alinement with said sleeve opening, a guard slidably mounted on said rotary sleeve in position to close said sleeve opening and prevent said pin from entering the same, means for operating said guard to uncover said opening, means acting automatically when said guard is operated to project said pin through said opening into said socket to lock said shaft and rotary sleeve together for operation by said gearing without compensation, and means acting automatically to retract said pin and unlock said shaft and sleeve after the same have attained a given rotative speed.

4. The combination with a rotating shaft, of a rotary sleeve journaled on said shaft, said sleeve and shaft being provided with an opening and socket respectively adapted to be brought into register, a compensating gearing operatively connected with said shaft and sleeve to drive the same, a disk fixed to said sleeve, a locking pin carried by said disk in alinement with said sleeve opening, a guard for closing said sleeve opening and preventing said pin from entering the same, a yieldingly actuated lever connected with said pin and acting to project the same, when said guard is retracted, through said opening into said socket to lock said shaft and sleeve together for operation by said gearing without compensation, said lever being constructed and arranged to be centrifugally actuated to retract said pin and thereby unlock said shaft and sleeve after the same have attained a given speed of rotation.

5. In a self-propelled vehicle, a continuous axle for connecting the drive wheels, a sleeve axle mounted on said continuous axle for connection to one of said wheels, a compensating gearing mounted on said continuous axle and operatively connected with both of said axles, means whereby said axles may be locked together for rotation as one axle without compensation, and means acting automatically after a given rotative axle speed has been attained for rendering said first means inoperative.

In testimony whereof, we affix our signatures, in the presence of two witnesses.

JOSEPH F. BLAKEY.
EDWARD B. BLAKEY.

Witnesses:
CHAS. W. GERARD,
G. Y. THORPE.